(12) United States Patent
Park et al.

(10) Patent No.: US 10,518,631 B2
(45) Date of Patent: Dec. 31, 2019

(54) AUTOMOTIVE GRILLE

(71) Applicants: HYUNDAI MOTOR COMPANY, Seoul (KR); KIA MOTORS CORPORATION, Seoul (KR)

(72) Inventors: Myeong Woo Park, Hwaseong-si (KR); Jae Chung Heo, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/825,269

(22) Filed: Nov. 29, 2017

(65) Prior Publication Data

US 2019/0031018 A1 Jan. 31, 2019

(30) Foreign Application Priority Data

Jul. 27, 2017 (KR) .......................... 10-2017-0095191

(51) Int. Cl.
*B60K 11/08* (2006.01)
*B60R 19/52* (2006.01)

(52) U.S. Cl.
CPC ............ *B60K 11/085* (2013.01); *B60K 11/08* (2013.01); *B60R 19/52* (2013.01)

(58) Field of Classification Search
CPC ....... B60K 11/085; B60K 11/08; B60R 19/52; B60R 2019/525; B60R 2019/527
See application file for complete search history.

(56) References Cited

U.S. PATENT DOCUMENTS

2018/0222418 A1* 8/2018 Shen ...................... B62D 25/12

FOREIGN PATENT DOCUMENTS

JP 2014234097 12/2014

OTHER PUBLICATIONS

"Study of Cooling Drag Reduction Method by Controlling Cooling Flow", Kubokura, T., Uno, T., Evans, N., Kuroda, H. et al., SAE Technical Paper Jan. 2014-0679, http://papers.sae.org/2014-01-0679; Apr. 14, 2014; 9 pages.

* cited by examiner

*Primary Examiner* — Stephen K Cronin
*Assistant Examiner* — Ruben Picon-Feliciano
(74) *Attorney, Agent, or Firm* — Lempia Summerfield Katz LLC

(57) ABSTRACT

An automotive grille has a plurality of openings that permit ambient air to flow into an engine compartment located on a front side of a vehicle. The automotive grille includes a plurality of decorative slats arranged to form the plurality of openings and a support part that supports the plurality of decorative slats. The plurality of openings is configured to guide the ambient air in a first flow direction. The first flow direction is a direction in which the ambient air flows into the engine compartment. The plurality of decorative slats is configured to guide the ambient air in a second flow direction that crosses the first flow direction.

4 Claims, 10 Drawing Sheets

AUTOMOTIVE GRILLE

CROSS-REFERENCE TO RELATED APPLICATION

This application is based on and claims the benefit of priority to Korean Patent Application No. 10-2017-0095191, filed on Jul. 27, 2017, in the Korean Intellectual Property Office, the disclosure of which is incorporated herein in its entirety by reference.

TECHNICAL FIELD

The present disclosure relates to an automotive grille. More specifically, the present disclosure relates to an automotive grille for effectively satisfying aerodynamic characteristics and cooling efficiency that conflict depending on a vehicle speed.

BACKGROUND

All vehicles typically have a grille mounted on the front thereof. The grille has a plurality of openings that permit ambient air to flow into an engine compartment. The grille may be mounted on the front of the vehicle to protect an engine, a radiator, and the like in the engine compartment.

Further, the engine for driving the vehicle and various types of heat exchangers, such as a radiator, an intercooler, an evaporator, a condenser, and the like, are mounted in the engine compartment.

If ambient air is introduced through the openings of the grille, the ambient air may flow into the engine compartment to appropriately cool the engine, the heat exchangers, or the like and to decrease the temperature of the engine compartment, thereby preventing heat damage to the engine compartment.

When the vehicle travels at a low speed, ambient air may flow into the engine compartment through the openings of the grille at a relatively low flow rate. When the vehicle travels at a high speed, ambient air may flow into the engine compartment through the openings of the grille at a relatively high flow rate.

In the case where ambient air flows into the engine compartment through the openings of the grille at a relatively high flow rate, cooling efficiency (and the ability to prevent heat damage) may be enhanced. However, aerodynamic characteristics of the vehicle may be degraded due to the increase in the flow rate of ambient air. In contrast, in the case where ambient air flows into the engine compartment through the openings of the grille at a relatively low flow rate, cooling efficiency (and the ability to prevent heat damage) may be degraded, but aerodynamic characteristics of the vehicle may be improved.

As described above, the flow rate of ambient air may vary depending on a change in the speed of the vehicle. The cooling efficiency and the aerodynamic characteristics may conflict according to a change in the flow rate of ambient air.

In order to overcome these problems, an active air flap system that adjusts opening/closing of an air flap according to the speed of a vehicle, the temperature of ambient air, or the like may be applied. Such a system may appropriately adjust the flow rate of ambient air, the inflow direction of ambient air, or the like, thereby stably improving cooling efficiency and aerodynamic characteristics that conflict with each other.

However, the active air flap system has problems in that a motor for driving the air flap and a support structure for supporting a movement of the air flap have a complicated construction, which leads to high power consumption by the motor, an increase in manufacturing cost, and an increase in the weight of a vehicle.

SUMMARY

The present disclosure is made to solve the above-mentioned problems occurring in the related art while advantages achieved by the related art are maintained.

An aspect of the present disclosure provides an automotive grille that has a passive flow-rate adjustment structure for flexibly adjusting the flow rate of ambient air flowing into an engine compartment according to a change in the speed of a vehicle. The flow rate adjustment thereby uniformly maintains cooling efficiency of the engine compartment without degrading aerodynamic characteristics of the vehicle.

The technical problems to be solved by the present disclosure are not limited to the aforementioned problems. Any other technical problems not mentioned herein will be clearly understood from the following description by those having ordinary skill in the art to which the present disclosure pertains.

According to an aspect of the present disclosure, an automotive grille has a plurality of openings that permit ambient air to flow into an engine compartment located on a front side of a vehicle. The automotive grille includes a plurality of decorative slats arranged to form the plurality of openings and a support part that supports the plurality of decorative slats.

The plurality of openings may be configured to guide the ambient air in a first flow direction. The first flow direction may be a direction in which the ambient air flows into the engine compartment. The plurality of decorative slats may be configured to guide the ambient air in a second flow direction that crosses the first flow direction.

Each decorative slat may have a top wall, a bottom wall, and a rear wall. A cavity may be formed in the decorative slat and may be defined by the top wall, the bottom wall, and the rear wall.

The second flow direction may be a direction in which the ambient air passes through the cavity and flows into the opening adjacent to the cavity.

Each decorative slat may have one or more first apertures and one or more second apertures that communicate with the cavity.

The first apertures and the second apertures may be configured to form the second flow direction.

The first apertures may be formed in a portion of the decorative slat that is directed toward an outer space in front of the decorative slat. The second apertures may be formed in a portion of the decorative slat that is directed toward the opening adjacent to the decorative slat.

The first apertures may be formed in a front end portion of the decorative slat.

The second apertures may be formed in the top wall of the decorative slat.

The second apertures may be formed in the bottom wall of the decorative slat.

The second apertures may be formed in the top wall and the bottom wall of the decorative slat.

The automotive grille may further include a plurality of straight slats arranged between the plurality of decorative slats.

Each straight slat may have a straight bar shape.

As described above, the automotive grille according to the present disclosure has a passive flow-rate adjustment structure for flexibly adjusting the flow rate of ambient air flowing into an engine compartment according to a change in the speed of a vehicle. The passive flow-rate adjustment structure thereby reduces the weight and manufacturing cost, compared with an existing active air flap system, and uniformly maintains cooling efficiency of the engine compartment without degrading aerodynamic characteristics of the vehicle.

In addition, the automotive grille according to the present disclosure may maintain the flow rate of ambient air flowing into an engine compartment at a constant level when a vehicle travels at a low speed. Maintaining the flow rate at a constant level thereby improves cooling efficiency of the engine compartment and may minimize the flow rate of ambient air flowing into the engine compartment when the vehicle travels at a high speed, thereby improving aerodynamic characteristics of the vehicle.

BRIEF DESCRIPTION OF THE DRAWINGS

The above and other objects, features, and advantages of the present disclosure will be more apparent from the following detailed description taken in conjunction with the accompanying drawings.

DETAILED DESCRIPTION

Figure 1:
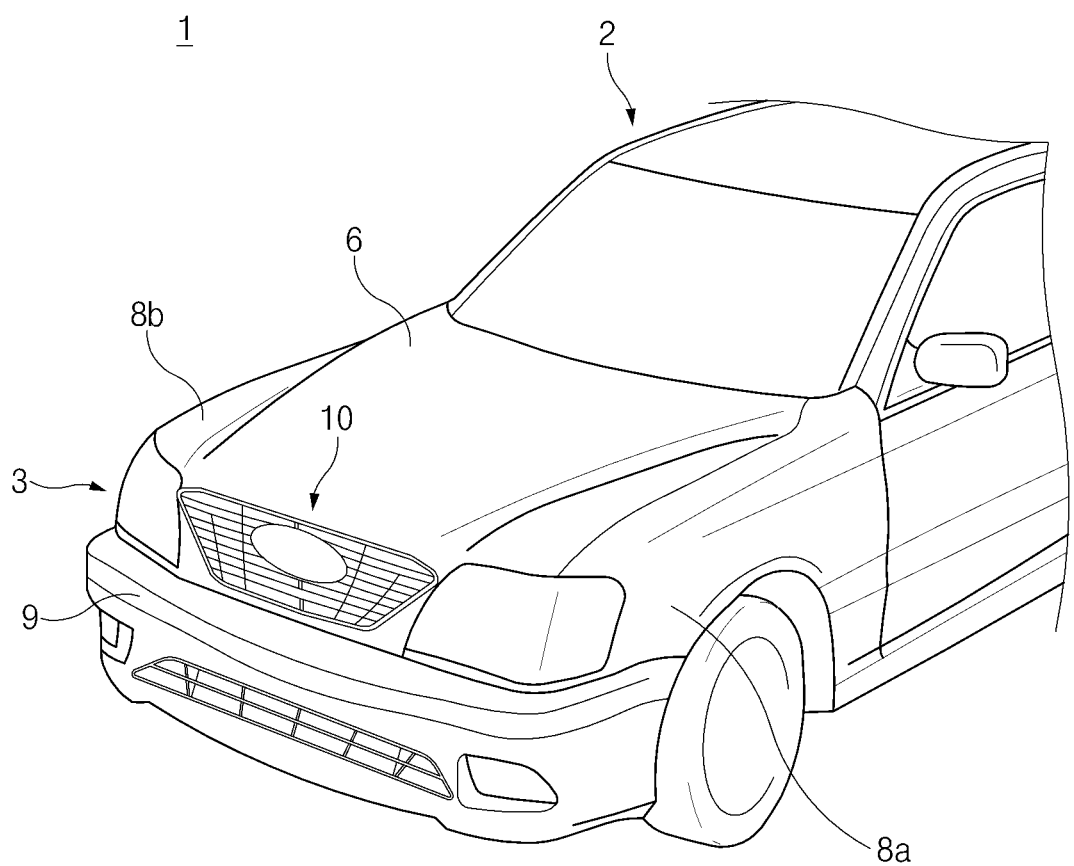
FIG. 1 is a perspective view illustrating a front side of a vehicle according to an embodiment of the present disclosure.

Hereinafter, embodiments of the present disclosure are described in detail with reference to the accompanying drawings. In the drawings, the same reference numbers are used throughout the drawings to designate the same or equivalent elements. In addition, a detailed description of well-known features or functions has been ruled out in order not to unnecessarily obscure the gist of the present disclosure.

Terms, such as "first", "second", "A", "B", "(a)", "(b)", and the like, may be used herein to describe elements of the present disclosure. Such terms are only used to distinguish one element from another element. The substance, sequence, order, or number of these elements is not limited by the use of these terms. Unless otherwise defined, all terms used herein, including technical and scientific terms, have the same meaning as those generally understood by those having ordinary skill in the art to which the present disclosure pertains. Such terms as those defined in a generally used dictionary are to be interpreted as having meanings equal to the contextual meanings in the relevant field of art. Such terms are not to be interpreted as having ideal or excessively formal meanings unless clearly defined as having such in the present application.

Referring to FIG. 1, a vehicle 1 may include a vehicle body 2. The vehicle body 2 may have a front end assembly 3. The front end assembly 3 may be disposed on a front side of the vehicle body 2.

The front end assembly 3 may include a hood 6, a pair of fenders 8a and 8b disposed on opposite sides of the hood 6, a front bumper structure 9 located between the pair of fenders 8a and 8b, an upper grille 10 disposed above the front bumper structure 9, and a lower grille 20 disposed below the front bumper structure 9.

Figure 4:
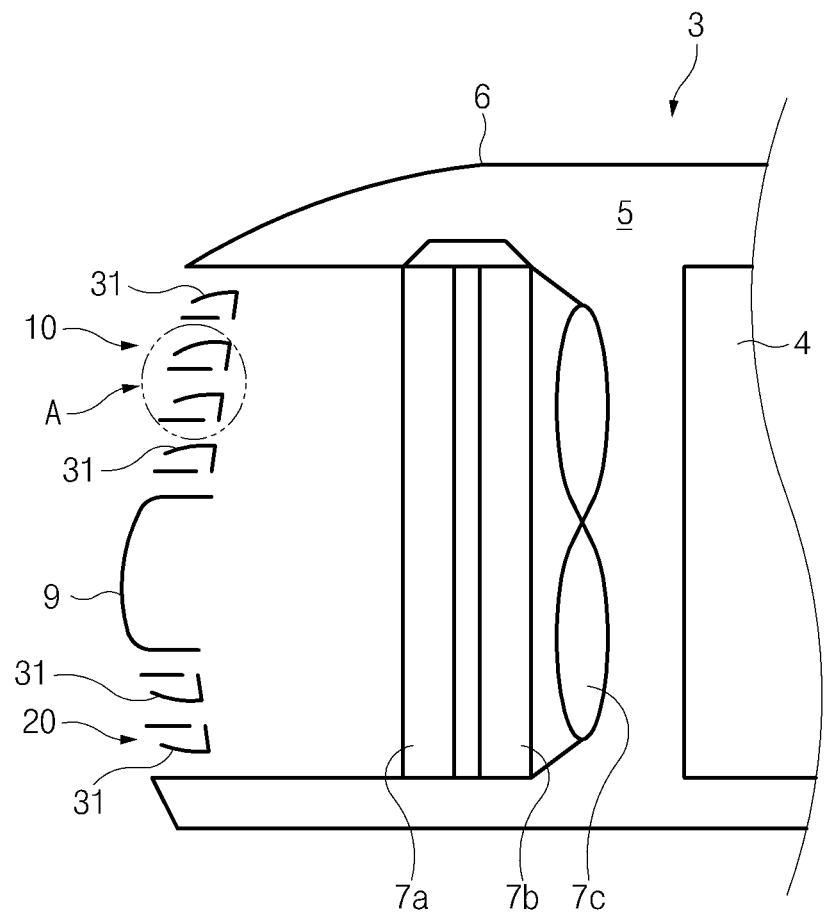
FIG. 4 is a sectional view illustrating the front side of the vehicle according to an embodiment of the present disclosure.
Figure 5:
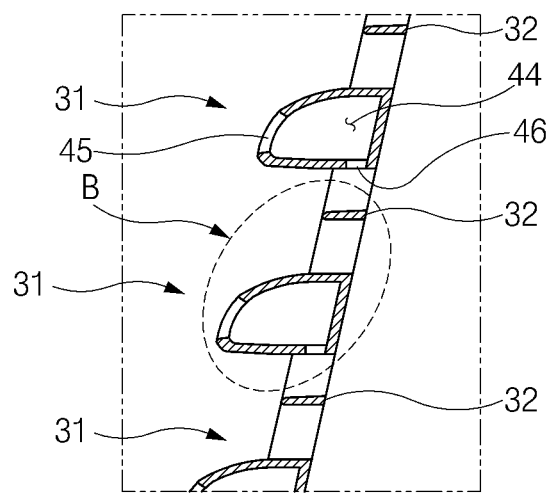
FIG. 5 is a blowup of detail A in FIG. 4.

As illustrated in FIG. 4, an engine compartment 5 may be disposed inside the front of the vehicle body 2. The hood 6 may open or close an open top of the engine compartment 5. An engine 4, a plurality of engine accessories (not illustrated) attached to the engine 4, an intercooler (not illustrated), a condenser 7a, a radiator 7b, and a cooling fan 7c for forcibly suctioning or sucking ambient air toward the condenser 7a and the radiator 7b may be mounted in the engine compartment 5.

According to an embodiment of FIG. 4, the radiator 7b may be located behind the condenser 7a. Alternatively, the arrangement of the radiator 7b and the condenser 7a may be changed in various ways depending on vehicle models.

The upper grille 10 and the lower grille 20 may each have a plurality of openings 30 through which ambient air flows. Ambient air introduced into the engine compartment 5 through the openings 30 of the upper and lower grilles 10 and 20 may cool heat exchangers, such as the radiator 7a, the condenser 7b, the intercooler, and the like. The ambient air may decrease the temperature of the engine 4 and the engine accessories in the engine compartment 5 to prevent heat damage to the engine 4 and the engine accessories.

The openings 30 of each of the grilles 10 and 20 may be configured to guide ambient air in a first flow direction F1. In this example, the first flow direction F1 may be a direction in which ambient air passes through the openings 30 and then flows into the engine compartment 5.

Ambient air introduced into the engine compartment 5 through the openings 30 of each of the grilles 10 and 20 in the first flow direction F1 may appropriately cool the heat exchangers, such as the radiator 7a, the condenser 7b, the intercooler, and the like. Such ambient air may decrease the temperature of the engine compartment 5 to effectively prevent heat damage to the engine 4 and the engine accessories (not illustrated) attached to the engine 4.

The upper grille 10 and the lower grille 20 may be configured to protect the heat exchangers (such as the radiator 7a, the condenser 7b, the intercooler, and the like) in the engine compartment 5 of the vehicle 1 from foreign substances.

Figure 2:
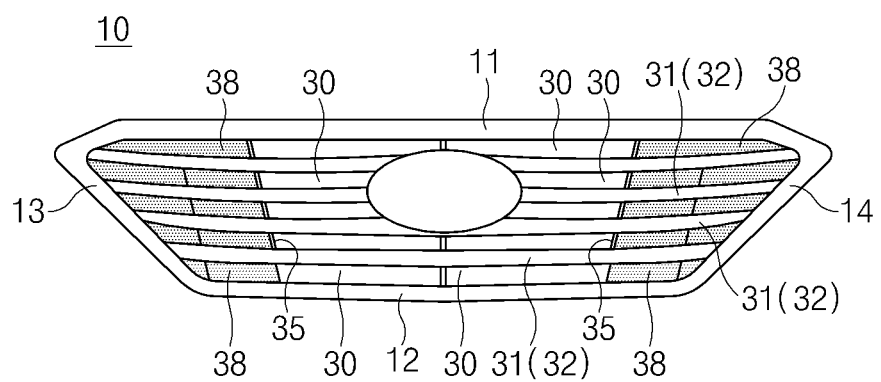
FIG. 2 is a front view of an upper grille according to an embodiment of the present disclosure.

Referring to FIG. 2, the upper grille 10 may have a top portion 11, a bottom portion 12, a first lateral portion 13, and a second lateral portion 14.

The top portion 11, the bottom portion 12, the first lateral portion 13, and the second lateral portion 14 may form a contiguous outer peripheral border portion of the upper grille 10. The outer peripheral border portion of the upper grille 10 may have various shapes, including a circular shape, a rectangular shape, and the like, without being limited to the shape illustrated in FIG. 2.

The upper grille 10 may include a plurality of slats 31 and 32 arranged to form the plurality of openings 30. The plurality of slats 31 and 32 may be connected to a plurality of support parts 35.

According to an embodiment, as illustrated in FIG. 2, the plurality of slats 31 and 32 may extend in a horizontal direction (the lateral direction of the vehicle body 2) and may be spaced apart from one another in a vertical direction. The support parts 35 may extend in the vertical direction. Closing parts 38 may be formed adjacent to the first and second lateral portions 13 and 14 of the upper grille 10. Thus, each opening 30 may have a length corresponding to the width of the heat exchangers, such as the radiator 7a, the condenser 7b, and the like.

According to another embodiment, the plurality of slats 31 and 32 may extend in the vertical direction and may be spaced apart from one another in the horizontal direction. Thus, the support parts 35 may extend in the horizontal direction.

The plurality of slats 31 and 32 may include the plurality of decorative slats 31 having a decorative feature and the plurality of straight slats 32 disposed between the plurality of decorative slats 31.

Each decorative slat 31 may have a top wall 41, a bottom wall 42, and a rear wall 43.

The top wall 41 may be formed to be longer than the bottom wall 42, which makes it possible to effectively prevent the engine compartment 5, which is a front inner space of the vehicle 1, from being exposed to the outside.

An outer surface of the top wall 41 may be a sloping surface or a curved surface 41a. A front end portion of the decorative slat 31 may be formed to be narrower than a rear end portion of the decorative slat 31 owing to the curved surface 41a of the top wall 41.

One or more steps 41b may be formed on the curved surface 41a of the top wall 41. The steps 41b may cause flow separation of ambient air. The flow separation of ambient air may cause a turbulent flow on the curved surface 41a of the top wall 41 to create a vortex, a wake, and the like. When the vehicle 1 travels at a high speed, flow separation of ambient air may be caused by the steps 41b to disturb or block ambient air passing through the plurality of openings 30, thereby further improving aerodynamic characteristics of the vehicle 1.

The decorative slat 31 may have a cavity 44 formed therein. The cavity 44 may be defined by the top wall 41, the bottom wall 42, and the rear wall 43.

The decorative slat 31 may have one or more first apertures 45 and one or more second apertures 46 that communicate with the cavity 44.

The first and second apertures 45 and 46 of the decorative slat 31 may be configured to guide ambient air in a second flow direction F2. In one example, the second flow direction F2 may be a direction in which ambient air passes through the cavity 44 and then flows into the opening 30 in communication with the second apertures 46.

According to an embodiment, the first and second apertures 45 and 46 of the decorative slat 31 may be configured such that the second flow direction F2 of ambient air crosses the first flow direction F1 of ambient air at a predetermined angle.

Figure 6:
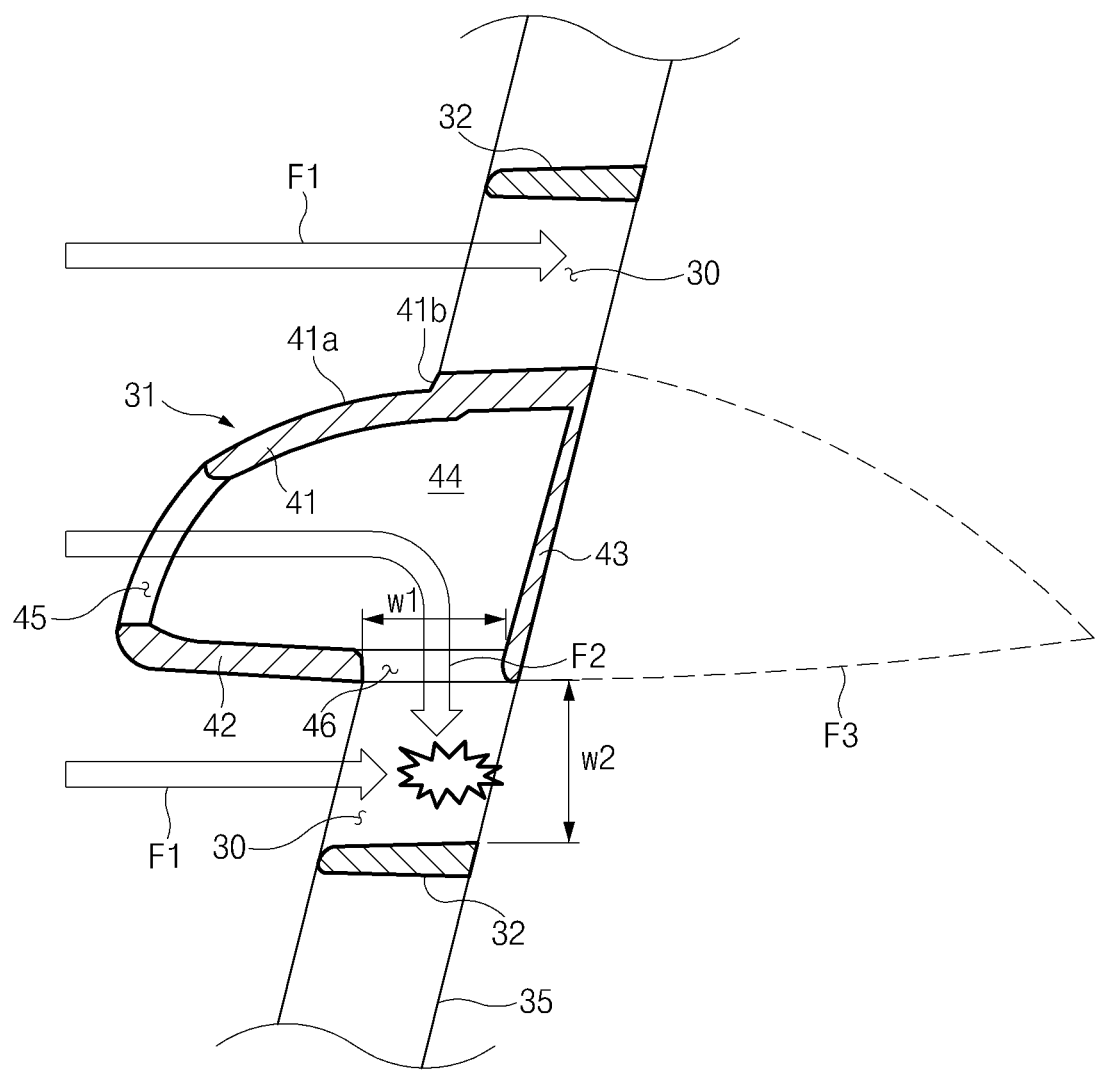
FIG. 6 is a blowup of detail B in FIG. 5.
Figure 7:
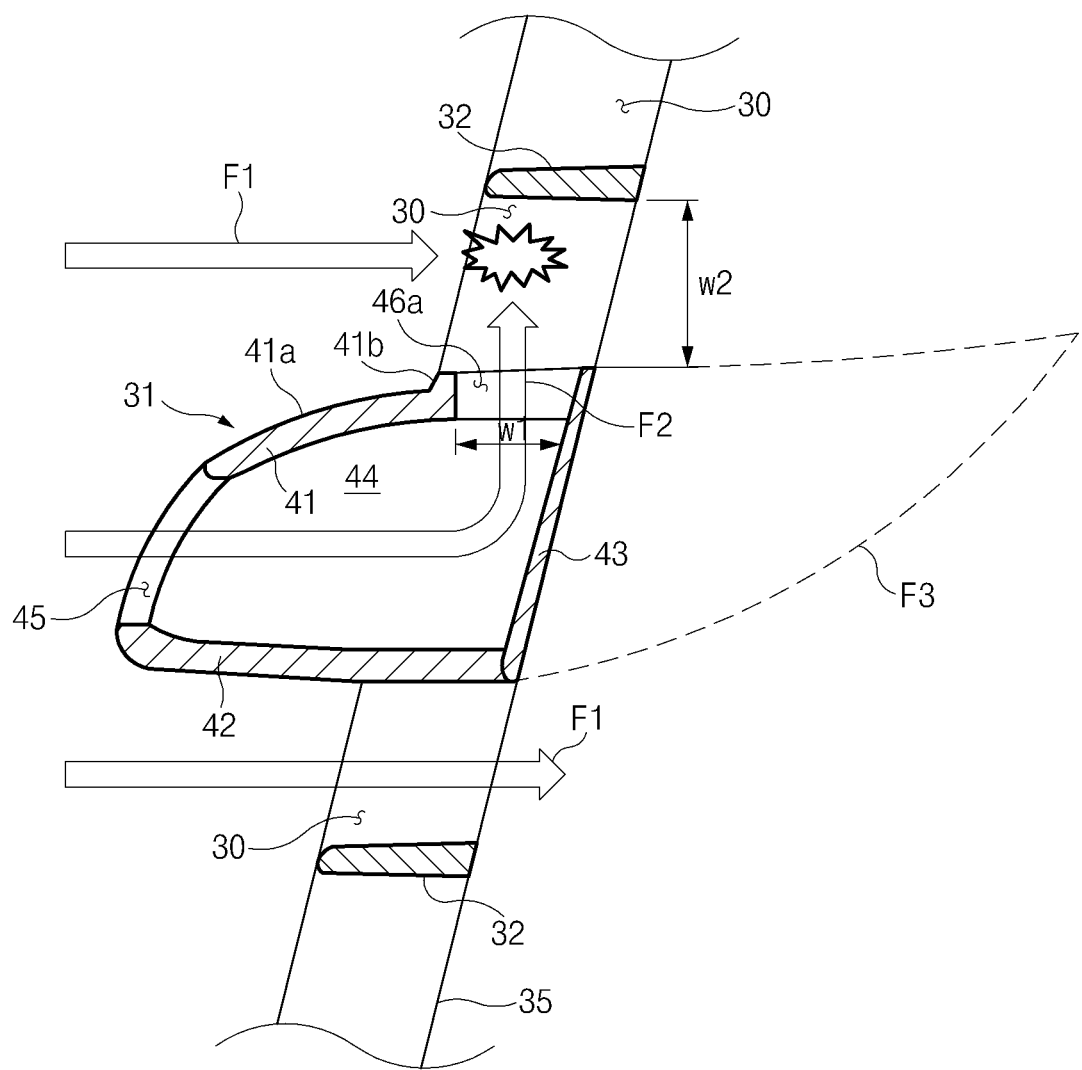
FIG. 7 illustrates a modified embodiment of FIG. 6.
Figure 8:
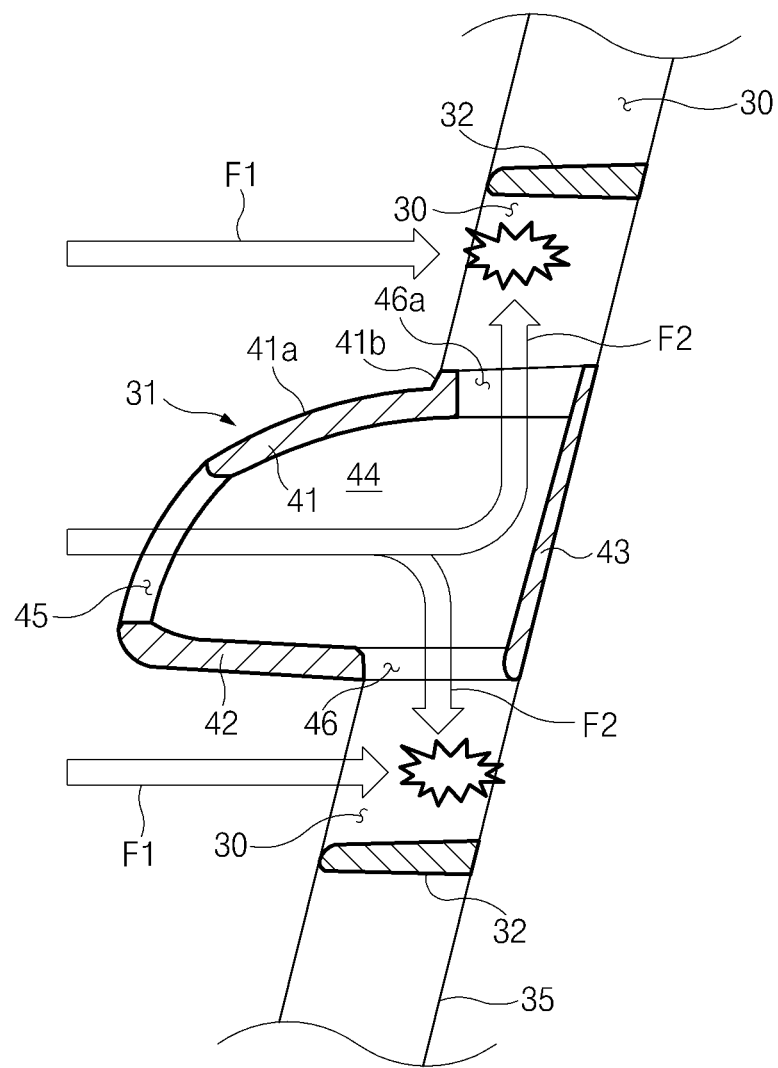
FIG. 8 illustrates a modified embodiment of FIG. 6.

According to several embodiments of FIGS. 6-8, the first and second apertures 45 and 46 of the decorative slat 31 may be configured such that the second flow direction F2 of ambient air is perpendicular to the first flow direction F1 of ambient air.

Since the second flow direction F2 crosses, or is perpendicular to, the first flow direction F1 as described above, ambient air flowing in the second flow direction F2 may disturb or block ambient air flowing in the first direction F1, as is described further below, when the vehicle 1 travels at a high speed.

The first apertures 45 may be formed in a portion of the decorative slat 31 that is directed toward an outer space in front of the decorative slat 31. According to the embodiments of FIGS. 6-8, the first apertures 45 may be formed at the front end of the decorative slat 31. In particular, the first apertures 45 may be formed in a portion between the front end of the top wall 41 and the front end of the bottom wall 42. The first apertures 45 may serve as an entrance to the cavity 44 to permit ambient air to flow into the cavity 44.

The second apertures 46 may be formed in a portion of the decorative slat 31 that is directed toward the opening 30 adjacent to the decorative slat 31. For example, as illustrated in FIGS. 6-8, the second apertures 46 may be formed in the top wall 41 and/or the bottom wall 42. The second apertures 46 may serve as an exit from the cavity 44 to permit ambient air introduced into the cavity 44 to flow out of the cavity 44.

As described above, the first apertures 45 may be formed in the portion of the decorative slat 31 that is directed toward the outer space in front of the decorative slat 31. The second apertures 46 may be formed in the portion of the decorative slat 31 that is directed toward the opening 30. Accordingly, the pressure in the first apertures 45 may be higher than the pressure in the second apertures 46. Thus, ambient air introduced into the cavity 44 through the first apertures 45 may be discharged from the cavity 44 through the second apertures 46. As a result, the second flow direction F2 of the ambient air passing through the cavity 44 of the decorative slat 31 may be formed.

Figure 9:
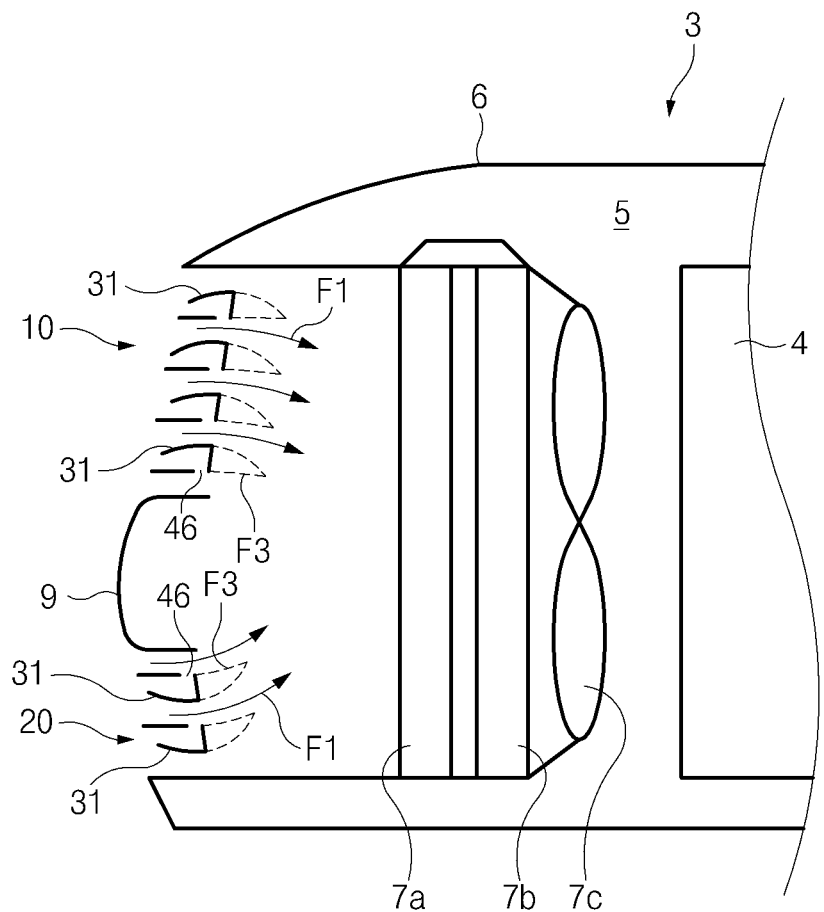
FIG. 9 is a sectional view illustrating a front side of a vehicle according to another embodiment of the present disclosure.

According to the embodiment of FIG. 6, the second apertures 46 may be formed in the bottom wall 42 of the decorative slat 31 and thus may directly communicate with the opening 30 adjacent to the bottom wall 42. If the second apertures 46 are formed in the bottom wall 42 as in the embodiment of FIG. 6, the first flow direction F1 of ambient air having passed through the opening 30 may be inclined downwards by ambient air discharged from the second apertures 46. Thus, a flow F3 of ambient air behind the rear wall 43 may be inclined downwards. For example, in the case where the second apertures 46 are formed in the bottom wall 42 of the decorative slat 31 of the upper grille 10 as illustrated in FIG. 9, ambient air having passed through the openings 30 of the upper grille 10 may be guided obliquely downwards toward the heat exchangers, such as the radiator 7b, the condenser 7a, and the like.

According to the embodiment of FIG. 7, the second apertures 46 may be formed in the top wall 41 of the decorative slat 31 and thus may directly communicate with the opening 30 adjacent to the top wall 41. If the second apertures 46 are formed in the top wall 41, the first flow direction F1 of ambient air having passed through the opening 30 adjacent to the top wall 41 may be inclined upwards by the second flow direction F2 of ambient air discharged from the second apertures 46. Thus, a flow F3 of ambient air behind the rear wall 43 may be inclined upwards. For example, in the case where the second apertures 46 are formed in the top wall 41 of the decorative slat 31 of the lower grille 20 as illustrated in FIG. 9, ambient air having passed through the openings 30 of the lower grille 20 may be guided obliquely upwards toward the heat exchangers, such as the radiator 7b, the condenser 7a, and the like.

According to the embodiment of FIG. 8, the two second apertures 46 may be separately formed in the top wall 41 and the bottom wall 42 of the decorative slat 31. Accordingly, the second apertures 46 formed in the top wall 41 may directly communicate with the opening 30 adjacent to the top wall 41, and the second apertures 46 formed in the bottom wall 42 may directly communicate with the opening 30 adjacent to the bottom wall 42.

Since the second apertures 46 are formed in the top wall 41 and/or the bottom wall 42 of the decorative slat 31 as described above, the second apertures 46 may directly communicate with the openings 30 of the upper grille 10. Thus, the second flow direction F2 may cross the first flow direction F1.

Meanwhile, the second apertures 46 may have a width w1 less than or equal to the width w2 of the openings 30. Thus, ambient air passing through the second apertures 46 may flow at a higher speed than ambient air passing through the openings 30.

Each straight slat 32 may have a straight bar shape. The straight slat 32 may be disposed between two adjacent decorative slats 31. Thus, the openings 30 may be separately formed between the straight slat 32 and the decorative slats 31.

Figure 3:
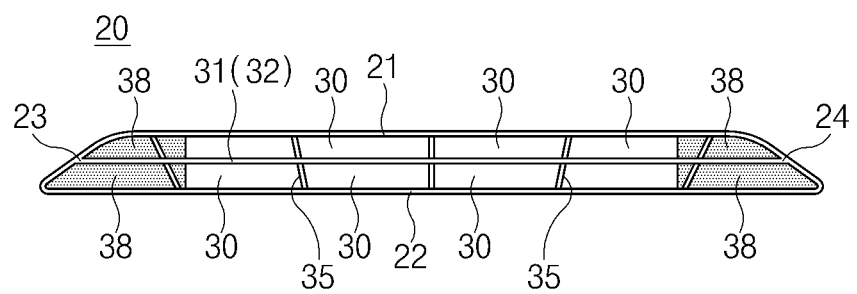
FIG. 3 is a front view of a lower grille according to an embodiment of the present disclosure.

Referring to FIG. 3, the lower grille 20 may have a top portion 21, a bottom portion 22, a first lateral portion 23, and a second lateral portion 24.

The top portion 21, the bottom portion 22, the first lateral portion 23, and the second lateral portion 24 may form a contiguous outer peripheral border portion of the lower grille 20. The outer peripheral border portion of the lower grille 20 may have various shapes, including a circular shape, a rectangular shape, and the like, without being limited to the shape illustrated in FIG. 3.

As with the above-described upper grille 10, the lower grille 20 may include a plurality of slats 31 and 32 arranged to form a plurality of openings 30. The plurality of slats 31 and 32 may be connected to a plurality of support parts 35.

According to an embodiment, as illustrated in FIG. 3, the plurality of slats 31 and 32 may extend in the horizontal direction (the lateral direction of the vehicle body 2) and may be spaced apart from one another in the vertical direction. The support parts 35 may extend in the vertical direction. Closing parts 38 may be formed adjacent to the first and second lateral portions 23 and 24 of the lower grille 20. Thus, each opening 30 may have a length corresponding to the width of the heat exchangers, such as the radiator 7a, the condenser 7b, and the like.

According to another embodiment, the plurality of slats 31 and 32 may extend in the vertical direction and may be spaced apart from one another in the horizontal direction. The support parts 35 may extend in the horizontal direction.

According to an embodiment, as with the above-described upper grille 10, the lower grille 20 may include one or more decorative slats 31 and one or more straight slats 32.

According to another embodiment, the lower grille 20 may include only the one or more decorative slats 31.

According to another embodiment, the lower grille 20 may include only the one or more straight slats 32.

The slats 31 and 32 of the lower grille 20 may have the same structure as the slats 31 and 32 of the upper grille 10.

When the vehicle 1 travels at a low speed or is in an idle or temporary stop state, the cooling fan 7c may operate to forcibly suction or suck ambient air toward the engine compartment 5 through the openings 30 of the upper grille 10 and the openings 30 of the lower grille 20.

As the cooling fan 7c operates as described above, ambient air may be forcibly suctioned or sucked toward the engine compartment 5 through the openings 30 and the first and second apertures 45 and 46 of the decorative slats 31 to cool the radiator 7b, the condenser 7a, and the like in the engine compartment 5 and to decrease the temperature of the engine 4 and the engine accessories.

When the vehicle 1 travels at a high speed, the inflow speed of ambient air may also increase in proportion to the speed of the vehicle 1. Thus, the flow rate at which the ambient air flows into the engine compartment 5 may increase. Accordingly, the cooling fan 7c may stop to prevent aerodynamic characteristics of the vehicle 1 from being degraded due to the increase in the flow rate of the ambient air.

In the state in which the cooling fan 7c has stopped, ambient air passing through each opening 30 may flow into the engine compartment 5 in the first flow direction F1. Ambient air passing through the first and second apertures 45 and 46 of the decorative slats 31 may flow in the second flow direction F2 at the same time. As described above, ambient air may flow into the engine compartment 5 of the vehicle 1 in the first flow direction F1 and the second flow direction F2 in the state in which the cooling fan 7c has stopped while the vehicle 1 is travelling at a high speed. In this case, ambient air discharged through the second apertures 46 may collide with ambient air flowing through the openings 30. Thus, the ambient air flowing into the engine compartment 5 through the openings 30 may be disturbed or blocked.

As illustrated in FIG. 9, the upper grille 10 and the lower grille 20 may each be configured to obliquely guide the first flow direction F1 of ambient air having passed through the openings 30 toward the heat exchangers. For example, in the case where the second apertures 46 are formed in the bottom walls 42 of the decorative slats 31 of the upper grille 10, the first flow direction F1 of ambient air having passed through the openings 30 of the upper grille 10 may be inclined downwards toward the heat exchangers, such as the radiator 7b, the condenser 7a, and the like. In the case where the second apertures 46 are formed in the top walls 41 of the decorative slats 31 of the lower grille 20, the first flow direction F1 of ambient air having passed through the openings 30 of the lower grille 20 may be inclined upwards toward the heat exchangers, such as the radiator 7b, the condenser 7a, and the like.

Since the first flow direction F1 of ambient air having passed through the openings 30 of the upper grille 10 and the openings 30 of the lower grille 20 is inclined toward the heat exchangers as described above, it is possible to remarkably enhance cooling efficiency of the heat exchangers when the vehicle 1 travels at a low speed.

Figure 10:
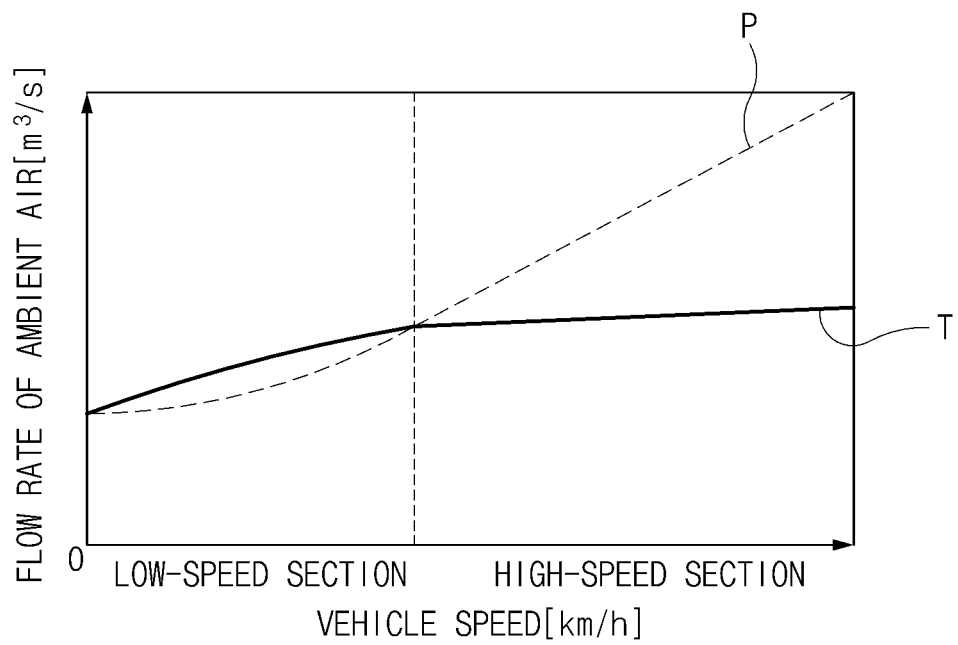
FIG. 10 is a graph depicting a relationship between a vehicle speed and a flow rate of ambient air according to the present disclosure and the related art.

FIG. 10 is a graph depicting a relationship between a vehicle speed and a flow rate of ambient air according to the present disclosure and the related art.

In a low vehicle-speed section, the flow rate (see line T of FIG. 10) of ambient air flowing into the engine compartment 5 through the grille of the present disclosure is slightly higher than the flow rate (see line P of FIG. 10) of ambient air flowing into the engine compartment 5 through the grille in the related art.

The flow rate of ambient air flowing into the engine compartment 5 in the low vehicle-speed section is slightly higher in the present disclosure than in the related art. Thus, the present disclosure may provide advantages of enhancing cooling efficiency of the heat exchangers, such as the radiator 7b, the condenser 7a, and the like, and of decreasing the temperature of the engine 4 and the engine accessories to effectively prevent heat damage to the engine compartment 5.

In contrast, in a high vehicle-speed section, the flow rate (see line T of FIG. 10) of ambient air flowing into the engine compartment 5 through the grille of the present disclosure is lower than the flow rate (see line P of FIG. 10) of ambient air flowing into the engine compartment 5 through the grille in the related art. The flow rate of ambient air flowing into the engine compartment 5 in the high vehicle-speed section is lower in the present disclosure than in the related art. Thus, aerodynamic characteristics of the vehicle may be remarkably improved.

According to the present disclosure, the first and second apertures 45 and 46 of the decorative slats 31 may guide ambient air in the second flow direction F2 to effectively disturb or block ambient air flowing into the engine compartment 5, thereby minimizing the flow rate of the ambient air flowing into the engine compartment 5 and thus improving aerodynamic characteristics of the vehicle.

In addition, according to the present disclosure, a passive flow-rate adjustment structure for flexibly adjusting the flow rate of ambient air flowing into the engine compartment 5 according to a vehicle speed change may be implemented with the first apertures 45, the second apertures 46, the cavity 44, and the like of the decorative slats 31. Accordingly, it is possible to construct a simple structure that does not need a flap, a motor, a support structure, and the like of an existing active air flap system, thereby reducing manufacturing cost and the weight of the vehicle.

Although the present disclosure has been described with reference to specific embodiments and the accompanying drawings, the present disclosure is not limited thereto. The disclosed embodiments may be variously modified and altered by those having ordinary skill in the art to which the present disclosure pertains without departing from the spirit and scope of the present disclosure.

Therefore, embodiments of the present disclosure are provided to explain the spirit and scope of the present disclosure, not to limit them. Thus, the spirit and scope of the present disclosure are not limited by the disclosed embodiments. The scope of the present disclosure should be construed on the basis of the accompanying claims, and all the technical ideas within the scope that are equivalent to the claims should be included in the scope of the present disclosure.

What is claimed is:

1. A grille having a plurality of openings that permit ambient air to flow into an engine compartment located on a front side of a vehicle, the grille comprising:
    a plurality of decorative slats arranged to form the plurality of openings; and
    a support part configured to support the plurality of decorative slats,
    wherein the plurality of openings guide the ambient air in a first flow direction,
    wherein the first flow direction is a direction in which the ambient air flows into the engine compartment,
    wherein the plurality of decorative slats guide the ambient air in a second flow direction that intersects with the first flow direction at a predetermined angle,
    wherein each decorative slat of the plurality of decorative slats has a top wall, a bottom wall, a rear wall, a cavity, a first aperture and a second aperture, wherein the first and second apertures communicate with the cavity,
    wherein the cavity is defined by the top wall, the bottom wall, and the rear wall,
    wherein the first aperture is formed in a portion of each decorative slat that faces toward an outer space in front of each decorative slat,
    wherein the second aperture is formed in a portion of each decorative slat that faces toward the opening adjacent to the decorative slat, and
    wherein the second flow direction is a direction in which the ambient air flows into each opening of the plurality of openings through the respective first aperture, cavity, and second aperture.

2. The grille of claim 1, wherein the first aperture of each decorative slat is formed in a front end portion of each decorative slat.

3. The grille of claim 1, wherein the second aperture of each decorative slat is formed in the bottom wall of each decorative slat.

4. The grille of claim 1, further comprising:
    a plurality of straight slats arranged between the plurality of decorative slats,
    wherein each straight slat has a straight bar shape.

* * * * *